(12) United States Patent
Offeman et al.

(10) Patent No.: US 8,617,395 B2
(45) Date of Patent: Dec. 31, 2013

(54) THIN FILM COMPOSITE MEMBRANES AND THEIR METHOD OF PREPARATION AND USE

(75) Inventors: Richard D Offeman, Pinole, CA (US); Charles N Ludvik, Moraga, CA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 645 days.

(21) Appl. No.: 12/941,776

(22) Filed: Nov. 8, 2010

(65) Prior Publication Data

US 2012/0080147 A1 Apr. 5, 2012

Related U.S. Application Data

(60) Provisional application No. 61/388,271, filed on Sep. 30, 2010.

(51) Int. Cl.
- *B01D 71/70* (2006.01)
- *B01D 61/36* (2006.01)
- *B01D 67/00* (2006.01)
- *B01D 71/00* (2006.01)

(52) U.S. Cl.
USPC . 210/640; 210/652; 210/500.21; 210/500.27; 210/649; 427/401; 427/149; 427/245

(58) Field of Classification Search
None
See application file for complete search history.

(56) References Cited

U.S. PATENT DOCUMENTS

| | | | |
|---|---|---|---|
| 4,925,562 A | 5/1990 | te Hennepe et al. | |
| 5,030,356 A | 7/1991 | Blume et al. | |
| 5,085,776 A | 2/1992 | Blume et al. | |
| 5,261,977 A * | 11/1993 | Powell | 156/74 |
| 5,702,503 A * | 12/1997 | Tse Tang | 95/45 |
| 5,759,672 A * | 6/1998 | Fujii et al. | 428/195.1 |
| 8,181,794 B2 * | 5/2012 | McGinnis et al. | 210/500.38 |
| 2005/0089633 A1 * | 4/2005 | Fenzi | 427/248.1 |
| 2007/0108120 A1 * | 5/2007 | Carlson | 210/500.25 |
| 2007/0298181 A1 * | 12/2007 | Kojima et al. | 427/401 |
| 2009/0098440 A1 * | 4/2009 | Hodgkinson et al. | 429/40 |
| 2011/0017390 A1 * | 1/2011 | Blake et al. | 156/247 |

OTHER PUBLICATIONS

Aroujalian, A., K. Belkacemi, S.J. Davids, G. Turcotte, and Y. Pouliot, "Effect of Protein and Flux and Selectivity in Pervaporation of Ethanol from a Dilute Solution" Separation Science and Technology (2003) 38(12 &13):3239-3247.

Baker, R., "Membranes and Modules" In: Membrane Technology and Applications 2nd Edition (2004) 119-123 John Wiley & Sons Ltd., England.

Blume, I., and J.G. Wijmans, R.W. Baker, "The Separation of Dissolved Organics from Water by Pervaporation" J. of Membrane Science (1990) 49:253-286.

(Continued)

*Primary Examiner* — Krishnan S Menon
(74) *Attorney, Agent, or Firm* — Howard V. Owens, Jr.; Lesley M. Shaw; John D. Fado

(57) ABSTRACT

The present invention is a technique to fabricate thin-film composite perm-selective membranes by a transfer method. The composite membranes are useful in separating liquid, vapor or gaseous mixtures by selective permeation and reduce mass transfer resistance of the support layer. Selectivity and flux are improved by reduction of the mass transfer resistance of the support layer.

25 Claims, 9 Drawing Sheets

(56) References Cited

OTHER PUBLICATIONS

Cen, Y., and R.N. Lichtenthaler, "Pervaporation Characteristics of Zeolite-Filled PDMS Composite Membranes" Proceedings of 6th International Conference on Pervaporation Processes in the Chemical Indusgtry (1992) 90-99.

Changlou, Z., L. Moe, and X. Wei, "Separation of Ethanol—Water Mixtures by Pervaporation—Membrane Separation Process" Desalination (1987) 62:299-313.

Dobrak, A., A. Figoli, S. Chovau, F. Galiano, S. Simone, I.F.J. Vankelecom, E. Drioli, and B. Van der Bruggen, "Performance of PDMS membranes in pervaporation: Effect of silicalite fillers and comparison with SBS membranes" J. of Colloid and Interface Science (2010) 346:254-264.

Gudernatsch, W., Th. Menzel, and H. Strathmann, "Influence of composite membrane structure on pervaporation" J. of Membrane Science (1991) 61:19-30.

Jia, M-D., K-V. Pememann, and R-D. Behling, "Preparation and characterization of thin-film zeolite—PDMS composite membranes" J. of Membrane Science (1992) 73:119-128.

Kaschemekat, J. J.G. Wijmans, R.W. Baker, and I. Blume, "Separation of Organics from Water using Pervaporation" Proceedings of 3rd International Conference on Pervaporation Processes in the Chemical Industry (1988) 405-412.

Li, L., S. Tan, D. Jiang, F. Wu, Z. Xu, and Z. Zhang, "Influence of support layer of composite PDMS membranes on performance of hydrophobic pervaporation" J. of Chemical Industry and Engineering (China) (2006) 57(1):61-65.

Liang, L., and E. Ruckenstein, "Pervaporation of ethanol—water mixtures through polydimethylsiloxane—polystyrene interpenetrating polymer network supported membranes" J. of Membrane Science (1996) 114:227-234.

O'Brien, D.J. and J.C. Craig, Jr., "Ethanol production in a continuous fermentation/membrane pervaporation system" Appl. Microbiol. Biotechnology (1996) 44:699-704.

Mulder, M., Preparation of Synthetic Membranes In: Basic Principles of Membrane Technology 2nd Edition (1996) 80-86 Kluwer Academic Publishers, The Netherlands.

Shabtai, Y., S. Chaimovitz, A. Freeman, and E. Katchalski-Katzir, "Continuous Ethanol Production by Immobilized Yeast Reactor Coupled with Membrane Pervaporation Unit" Biotechnology and Bioengineering (1991) 38:869-876.

Vankelecom, I.F.J., B. Moermans, G. Verschueren, and P.A. Jacobs, "Intrusion of PDMS top layers in porous supports" J. of Membrane Science (1999) 158:289-297.

Wei, Z., Y. Xingju, and Y. Quan, "Ethanol Fermentation Coupled with Complete Cell Recycle Pervaporation System: Dependence of Glucose Concentration" Biotechnology Techniques (1995) 9(4):299-304.

* cited by examiner

THIN FILM COMPOSITE MEMBRANES AND THEIR METHOD OF PREPARATION AND USE

RELATED APPLICATIONS

This application is claims priority to U.S. Provisional Patent Application Ser. No. 61/388,271, filed Sep. 30, 2010 the contents of which are incorporated herein by reference in their entirety.

BACKGROUND OF THE INVENTION

1. Field of the Invention

The present invention relates to thin film composite membrane production via a transfer process and technology for use.

2. Description of the Art

For selective separation of fluids by permeation, membranes with very thin permselective active layers are desirable. As a consequence of Fick's first law of diffusion, flux (amount permeated per membrane area per time) is inversely proportional to active layer thickness. This relationship is represented generically in FIGS. 1A and 1B. As the thickness of the active layer is reduced, so is the membrane area that is required to obtain a specified quantity of permeate, and hence equipment costs are reduced. But very thin active layers are fragile, and need a mechanically strong porous support layer to preserve their integrity during fabrication and use. As described by R. W. Baker in Membrane Technology and Applications, 2nd ed., John Wiley & Sons, Ltd, 2004, the characteristics of the microporous support are very important. The pores of the support layer in contact with the active layer must be small enough to support the active layer under high pressure, smaller than the thickness of the active layer, but also must be close together so that the path length for permeate diffusion to the pores is short. When the thickness of the thin-film active layer is in the range of a few microns or less, the small size of the pores can contribute significant mass transport resistance. The effect of this additional mass transport resistance is to reduce flux and also separation factor below the values expected for the active layer alone.

Blume et al. U.S. Pat. No. 5,085,776 describe a method for designing composite membranes for gas separations having a microporous support coated with a permselective layer. The method involves calculating the minimum thickness of the permselective layer such that the selectivity of the composite membrane is close to the intrinsic selectivity of the permselective layer. The calculation indicates that the support resistance is preferably less than 10% that of the active layer. By this calculation, a support with a relatively high mass transport resistance should be paired with a relatively thick active layer to avoid significant reductions in the selectivity. The negative aspect being that thicker active layers result in significantly reduced flux.

Additionally, as described by M. Mulder, Basic Principles of Membrane Technology, 2nd ed., Kluwer Academic Publishers, 1998, most composite membranes are prepared by a process that applies a solvent solution of the polymer or pre-polymer by a coating technique to the support layer. The active layer is formed by evaporation of the solvent and cross-linking of the polymer. The problem with simply coating the receiving support layer directly with the active layer coating mixture is that the coating mixture can penetrate the pores of the support layer. After curing, the effective thickness of the active layer is the sum of the thickness of the film on top of the receiving support plus the depth of the penetration of the coating mixture into the pores of the receiving support. W. Gudernatsch et al., "Influence of composite membrane structure on pervaporation", J. Membrane Sci., 61, p. 19-30 (1991) and I. Vankelecom et al., "Intrusion of PDMS top layers in porous supports", J. Membrane Sci., 158, p. 289-297 (1999) describe the importance of the surface porosity characteristics of the support layer skin in contact with the active layer, the problem of pore penetration and various methods to attempt to avoid it. One technique is to reduce the pore size of the support to exclude the large polymer molecules of the active layer, but as described above, this use of very small pores restricts flow of the permeating vapors through the support layer and increases mass transport resistance. Another possibility is to use a casting solvent that does not wet the support material, and hence will not penetrate the pores, but this is a very restrictive requirement for membranes where permeation of non-aqueous species are desired.

The effects of using small pore size supports is evident in FIG. 2, which plots permeance against the inverse of the active layer thickness for polydimethylsiloxane (PDMS) thin-film composite (TFC) membranes described in the literature, for pervaporation of ethanol from dilute ethanol/water solutions. Since operating conditions (temperature, feed concentration, permeate pressure) varied, the reported flux data are recalculated as permeances (basically, the driving force-normalized flux) in order to have a common basis. Support layers vary, but it is clear that as the active layer thickness is reduced below about 5 microns, permeance falls well-below the trendline which extrapolates from the permeances of the thicker TFC membranes.

The use of a composite membrane comprising a thin, non porous active layer which can be used in conjunction with high pore size and high porosity supports to greatly reduce mass transfer resistance in the support and improve flux and separation factor of the composite is therefore desired. Additionally, removing the possibility of undesired interactions between the active layer's casting solvent and the material of the support layer would be beneficial in that these materials could be chosen independently, thus allowing a wider range of materials and solvents to be used.

SUMMARY OF THE INVENTION

An embodiment of the invention is a method of making a thin-film composite membrane. The method, illustrated in FIG. 3, involves forming a removable transfer film, forming a thin film of different composition (the active layer) on one surface of the transfer film, curing or partially curing the active layer, placing the resulting composite on a receiving support layer with the active layer facing the receiving support layer, optionally adhering the active layer to the receiving support layer, and removing the transfer film to result in a thin-film composite.

An additional embodiment is the use of in-module dissolution wherein after production of the membrane assembly into an appropriate module design containing the composite that has intact transfer film, the transfer film is dissolved away or removed after assembly of the module.

Another embodiment of the invention is the use of the thin film membrane for liquid, vapor or gas separations, and other applications/products requiring a barrier or selectively permeable film. A further embodiment is to use a microporous receiving support layer, such as an ultrafiltration or microfiltration membrane, making a thin film composite membrane useful for gas separation, vapor permeation, or pervaporation of liquid solutions.

DEFINITIONS

Figure 1A:
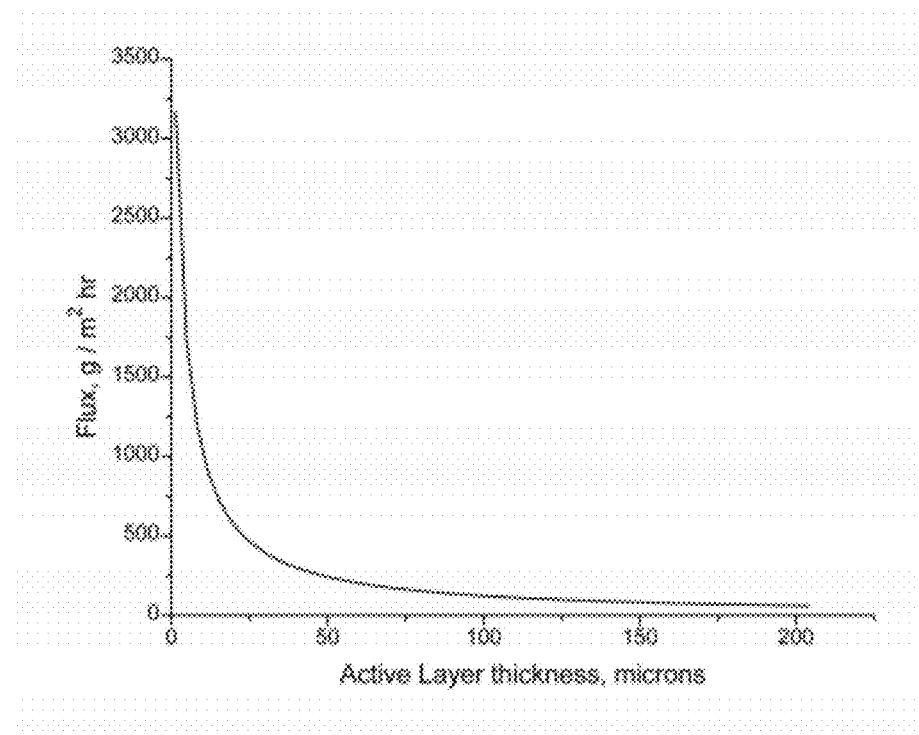
FIG. 1A—is a generic depiction of flux versus active layer membrane thickness as a consequence of Fick's first law of diffusion.
Figure 1B:
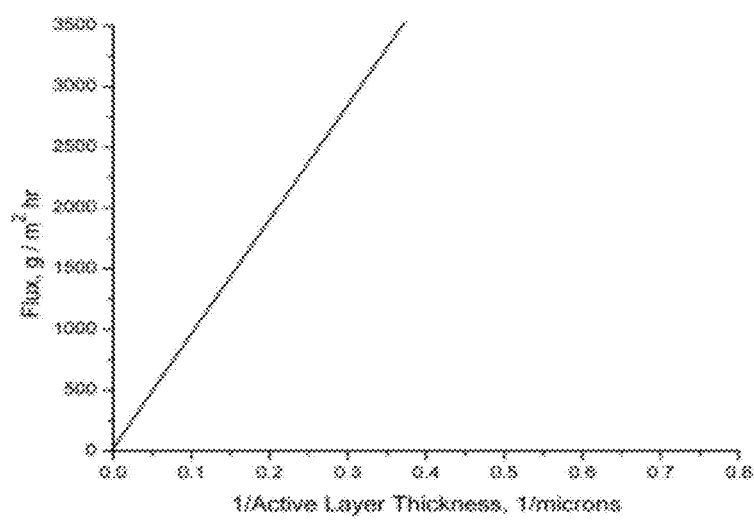
FIG. 1B—is a replot of FIG. 1A to flux versus the inverse of the active layer membrane thickness, showing the linear nature of the relationship.
Figure 2:
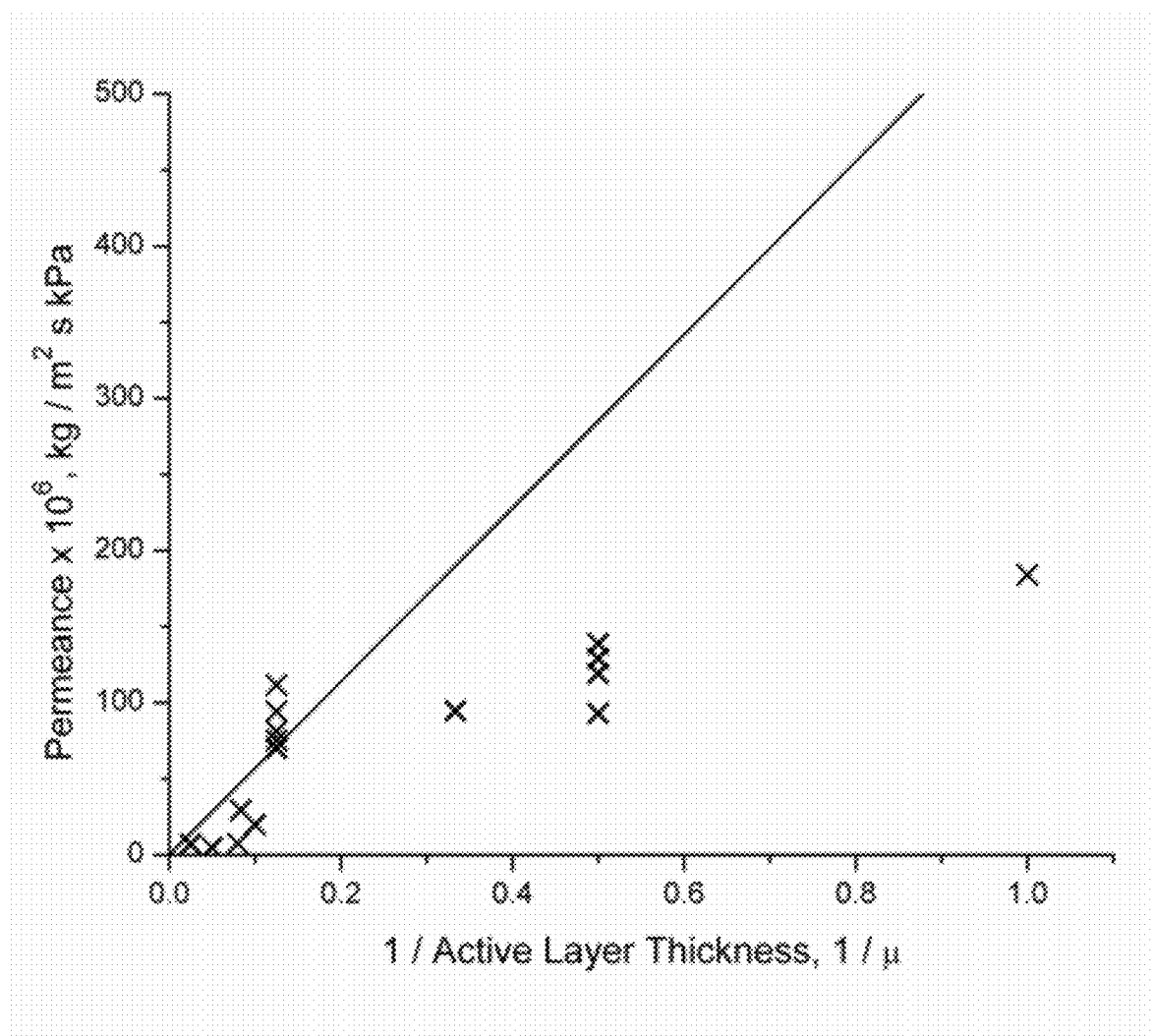
FIG. 2—is a graph of performance of PDMS thin-film composite membranes found in the literature, plotting permeance versus the inverse of the thickness of the active membrane layer, for a variety of supports and pervaporation conditions. The permeance is calculated from reported values of the flux, feed and permeate concentrations, temperature, and permeate pressure.

"Permeation" is the penetration of permeate molecules through a solid, generally involving sorption of the permeate into the solid, diffusion through the solid, and desorption on the opposite side of the solid.

"Feed" is the parent liquid, gas or vapor mixture, from which a product is to be separated.

"Flux" is the amount of permeate obtained per unit area of membrane, per unit time (usually in $g/(m^2 \, hr)$).

"Permeance" is the flux divided by the concentration difference across the membrane, basically a driving force-normalized flux, with units of $kg/m^2 \, s \, kPa$:kg of permeate per square meter of membrane area, per second, per unit of partial pressure difference across the membrane.

A "membrane" is a thin barrier that permits selective mass transport

A "composite membrane" is a membrane made up of two or more structural elements made from different materials.

A "thin film composite" membrane is a composite membrane whose active layer requires a mechanical support. For example, a porous support layer provides mechanical strength, and a very thin top-layer (the active layer) performs the separation.

"Permeate" is the portion of the feed mixture which penetrates the membrane.

"Permselective" describes the quality of a membrane to carry out the selective separation of components of a mixture by the difference in their permeation rates through the membrane.

The "active layer" refers to the very thin permselective layer of a composite membrane that controls the separation of components in a mixture by differential permeation, the other layers of the composite membrane having little or no permselectivity.

The "support layer" of a composite membrane is a porous, mechanically strong layer which provides support to the fragile active layer.

The "transfer film" or "transfer layer" is a temporary layer upon which the active layer is formed and then transported and interfaced to the support layer, after which the transfer film is removed.

"Pervaporation" refers to a separation process whereby a liquid feed solution contacts a nonporous membrane, a portion of the feed permeates through the membrane, and the permeate exits the membrane as a vapor. The term "pervaporation" is a contraction of the words "permeation" and "evaporation".

"Retentate" refers to that portion of the feed mixture which remains after contact with the membrane; i.e. the portion that has not permeated into the membrane. "Solvent" refers to a liquid that can dissolve a solid material or a liquid material. "Membrane module" is a configuration of one or more membranes, configured in such a way as to direct the feed solution to one side of the membrane, remove retentate from that side of the membrane, and remove permeate from the other side of the membrane. Examples of types of modules are the spiral-wound, the plate-and-frame, the tubular, and the hollow fiber designs.

"Separation factor" is defined as the concentration of component A in the product stream divided by its concentration in the feed stream, this ratio further divided by the ratio of the concentration of component B in the product divided by its concentration in the feed.

A "feed spacer" is a thin mesh layer that is located between membrane envelopes in a membrane module. The feed spacer provides physical separation between the membrane envelopes to allow distribution of the feed across the entire membrane surface. It also promotes turbulent mixing in the flow of the feed, which reduces the formation of a zone in contact with the membrane surface which is depleted in the permeating compounds.

A "mixed matrix membrane" refers to the composition of the active layer. It is a mixture of small solid particles embedded within a continuous polymer matrix. The particles may be adsorbents (to increase permselectivity beyond that of the polymer), or fillers (to improve mechanical or barrier properties of the polymer).

DETAILED DESCRIPTION OF THE INVENTION

The product of this fabrication method is a thin film composite membrane comprising at least two layers: a thin, nonporous active layer and a porous support layer. By selective permeation, the active layer separates one or more components of a feed mixture (fluid, vapor or gas), resulting in a permeate which, compared to the feed, is enriched in one or more components and depleted in others. The active layer may be a polymer, copolymer, or blend of polymers. It may also have a mixed matrix composition, wherein small solid particles are embedded within a continuous polymer matrix. The active layer may also contain other additives to enhance selective permeation or the physical properties of the membrane, or aid in its formation. Additives may include, but are not limited to, adsorbents such as zeolites, carbon molecular sieves, filler particles (e.g. fumed silica, carbon black), plasticizers, surfactants and stabilisers.

The thickness of the active layer may also be minimized to achieve high flux rates of 800-5000 $g/m^2$ hr with active layer thicknesses of 1-10 microns. Flux rates above 4500 $g/m^2$ hr may be achieved with the composite membrane of the invention. An active layer thickness below 10 microns, and preferably around 1 micron is desired. The support layer is thicker than the active layer, typically in the range of 100-400 microns in thickness, and is porous. It is a backing to the active layer that provides mechanical integrity. The support layer can itself be a composite of a microporous layer and a nonwoven layer providing additional mechanical support. Other layers may also be present, such as a protective topcoat on the active layer to protect it from damage or to modify its fouling characteristics, and/or an intermediate layer between the active layer and the porous support layer to promote compatibility or adhesion between the layers or to improve mass transfer characteristics of the composite membrane.

Figure 4A:
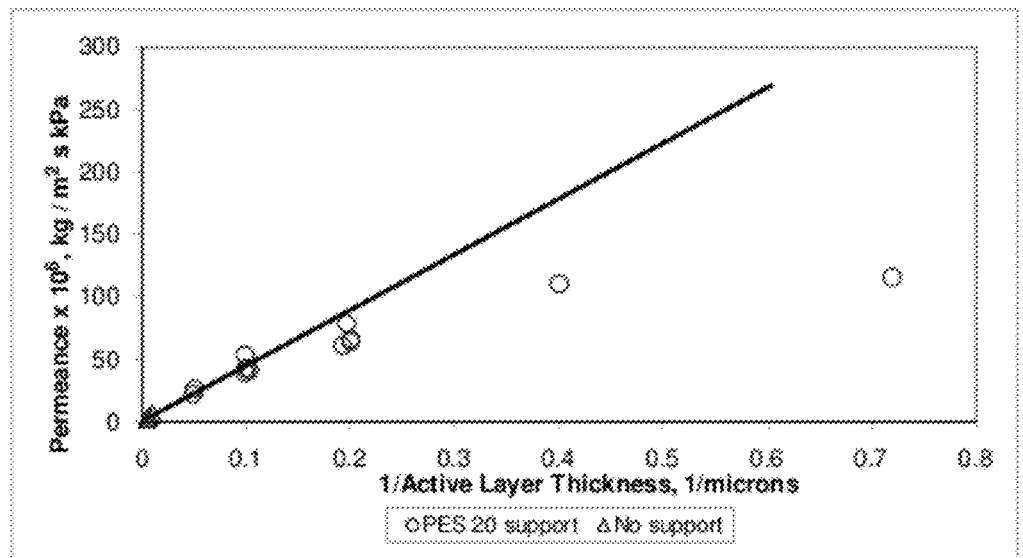
FIG. 4A—is a graph of permeance versus the inverse of the thickness of the active membrane layer, for TFC membranes prepared in our labs at pervaporation conditions at 50° C., 5 wt % ethanol feed, and 0 torr permeate pressure for a PDMS active layer on a small pore size PES 20 support layer.
Figure 4B:
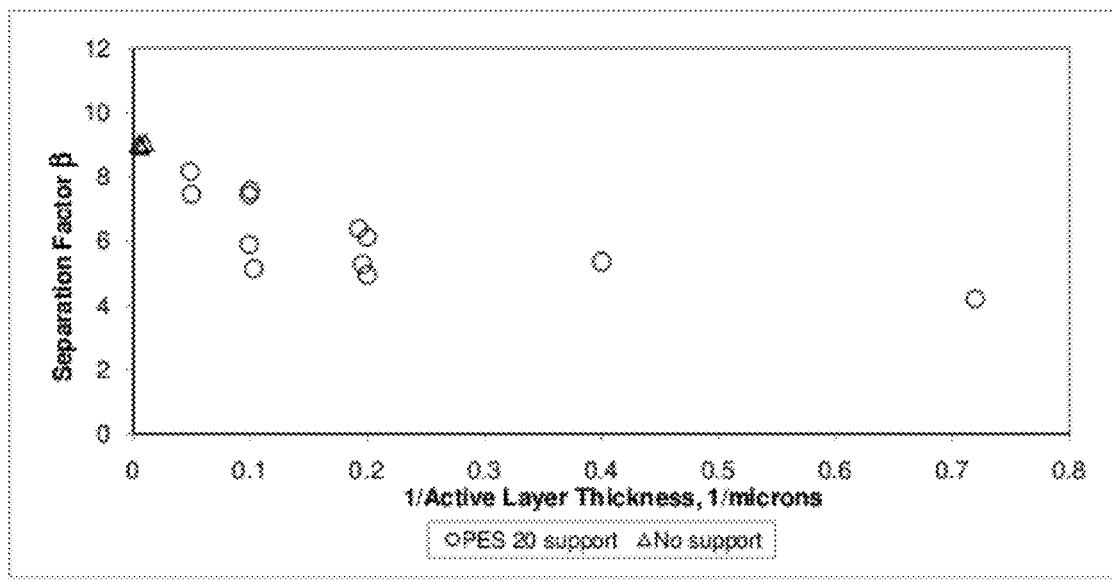
FIG. 4B—is a graph of separation factor versus the inverse of the active membrane thickness for the same data set.

The advantage of the fabrication method is to allow use of larger pore size and higher porosity support layers to more closely approach the expected performance of the active layer alone by reducing the mass transfer resistance of the support layer. The benefits may be seen by comparing the performance using PDMS TFCs fabricated with small pore supports to the performance of those fabricated from larger pore supports in pervaporation of ethanol from aqueous solutions. TFCs in the literature are commonly fabricated using an ultrafiltration membrane as the support layer. A series of PDMS TFCs of varying active layer thicknesses were prepared on a PES 20 ultrafiltration membrane as the support (Sepro, Oceanside, Calif.), a polyethersulfone asymmetrically porous coating on a nonwoven polyester support layer. The performance of these TFCs is shown in FIGS. 4a and b. FIG. 4a shows permeance versus the inverse of the active layer thickness. FIG. 4b shows the separation factor versus the inverse of the active layer thickness. The figures include 3 unsupported PDMS membranes in the range of 100-200 microns thickness. As the thickness of the active layer is reduced below 10 microns permeance deviates negatively from the trendline, indicating the increasing dominance of the support mass transport resistance. Likewise, separation factor in FIG. 4b decreases as the active layer becomes very thin.

Figure 5A:
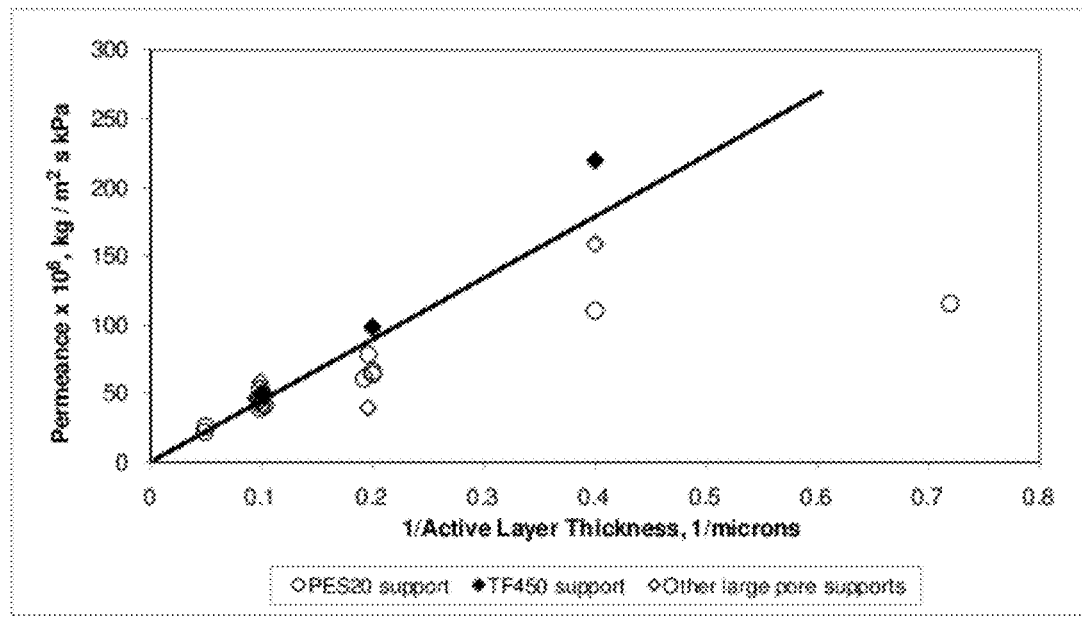
FIG. 5A—is a graph of permeance versus the inverse of the active layer thickness for PDMS thin-film composites prepared in our lab using support layers of various pore sizes and porosities. PES 20 is a small pore size ultrafiltration membrane; TF 450 is a large pore size, high porosity microfiltration membrane. Results for several TFCs made with other large pore supports are also shown.
Figure 5B:
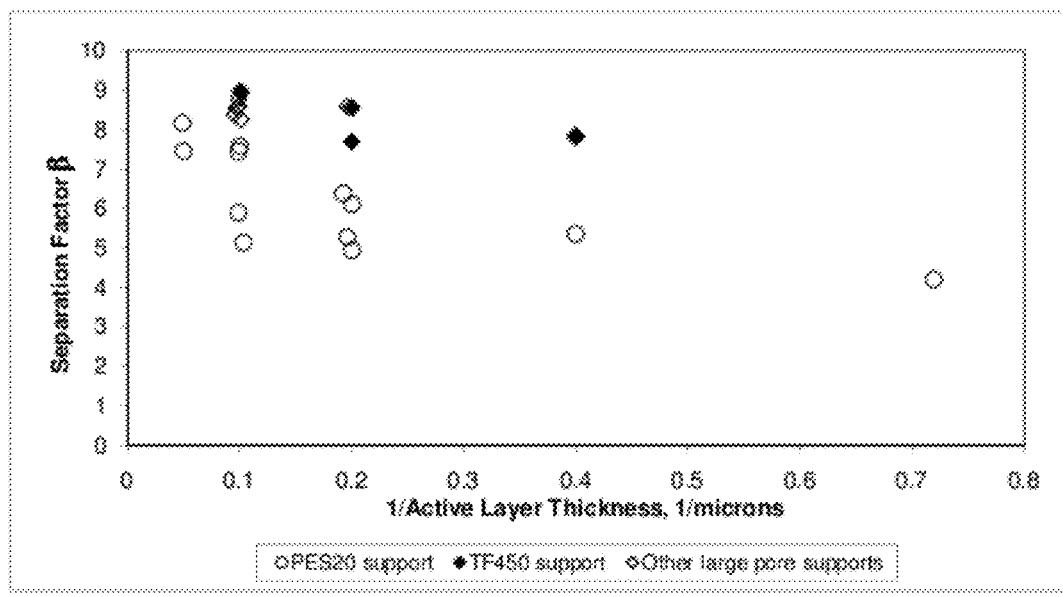
FIG. 5B—is a graph of separation factor versus the inverse of the active membrane thickness for the same data set.

In contrast, PDMS TFCs fabricated with large pore size, high porosity supports can achieve close to the theoretical performance of an unsupported active layer. This can be seen in FIGS. 5a and b, where the data for large pore size supports are superimposed on the PES20 data from FIGS. 4a and b. The PDMS TFC fabricated with the TF-450 support (Pall Corp., Ann Arbor, Mich.) shows superior permeance and separation factor for a 2.5 micron thick active layer compared to the 2.5 micron TFC with the small pore size PES 20 support.

The usefulness of our fabrication method is that, unlike with most coating methods, relatively large pore size, high porosity supports can be use, resulting in significant improvement in TFC performance.

Figure 6A:
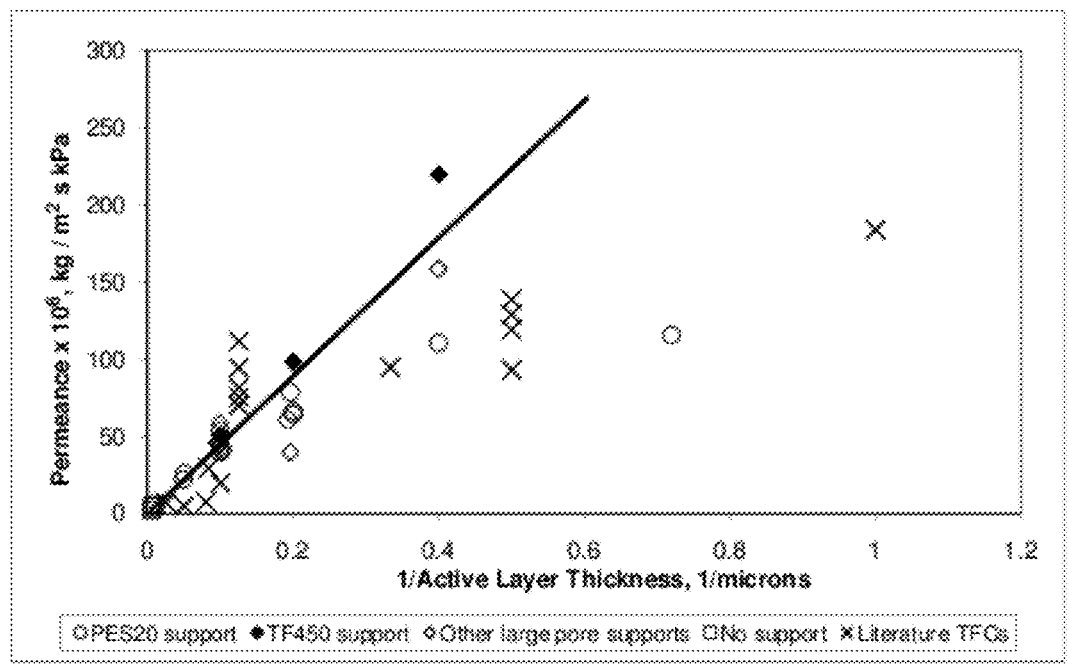
FIG. 6A—combines the information in FIGS. 2, 4, and 5. It is a graph of permeance versus the inverse of the active layer thickness for PDMS thin-film composites, combining results from the literature with results from composite membrane prepared in our lab with a variety of supports.
Figure 6B:
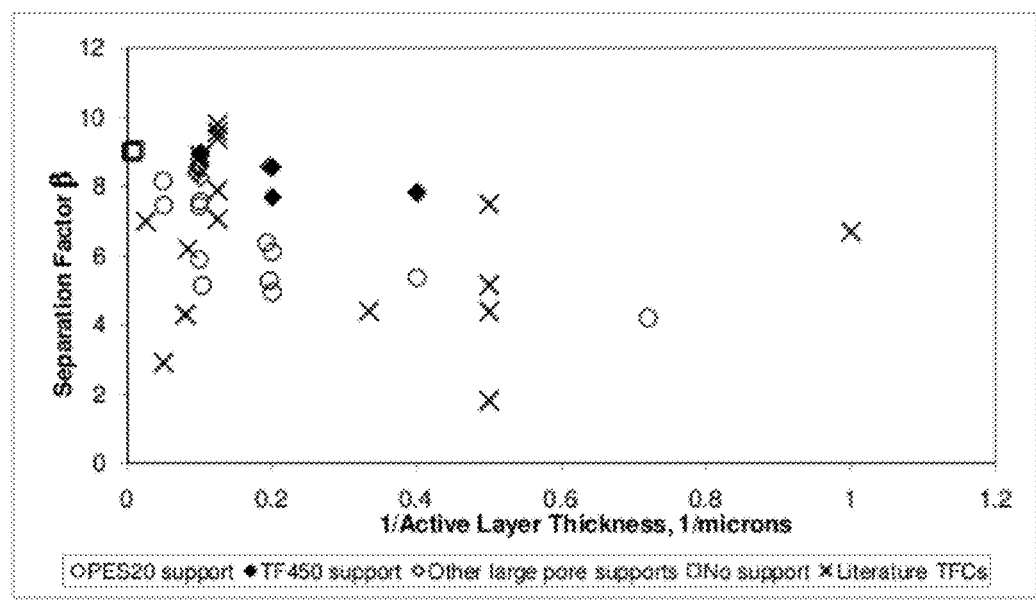
FIG. 6B—is a graph of separation factor versus the inverse of the active membrane thickness for the same data set.

FIGS. 6a and b combine our data for PDMS on PES20 and TF-450 and other large pore size supports, with performance data from the literature. Again, the benefits of the fabrication method in being able to produce TFCs with low mass transport resistance in the support layer are clear.

Figure 7:
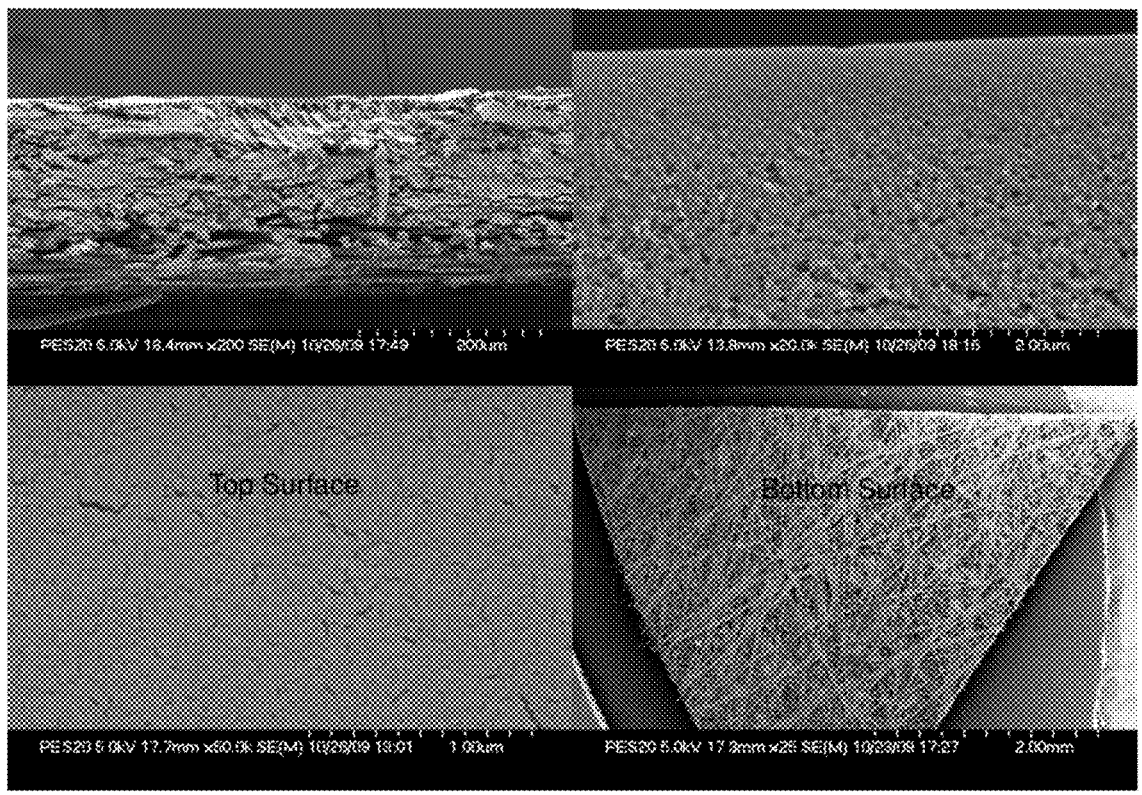
FIG. 7—is a display of 4 scanning electron micrographs (SEMs) of a small pore size PES 20 ultrafiltration membrane showing its asymmetric nature and low pore size and porosity. Top left is a cross-section at 200 microns scale of the entire membrane thickness showing at the top the small pore size ultrafiltration layer and below the nonwoven underlayer; top right is a cross-section showing a magnified view at the 2 microns scale of the upper surface; bottom left is a view of the surface at high magnification (1 micron scale) showing the small pore size and low porosity of the surface; bottom right is a low magnification (2 mm scale) of the bottom surface showing the non-woven layer.
Figure 8:
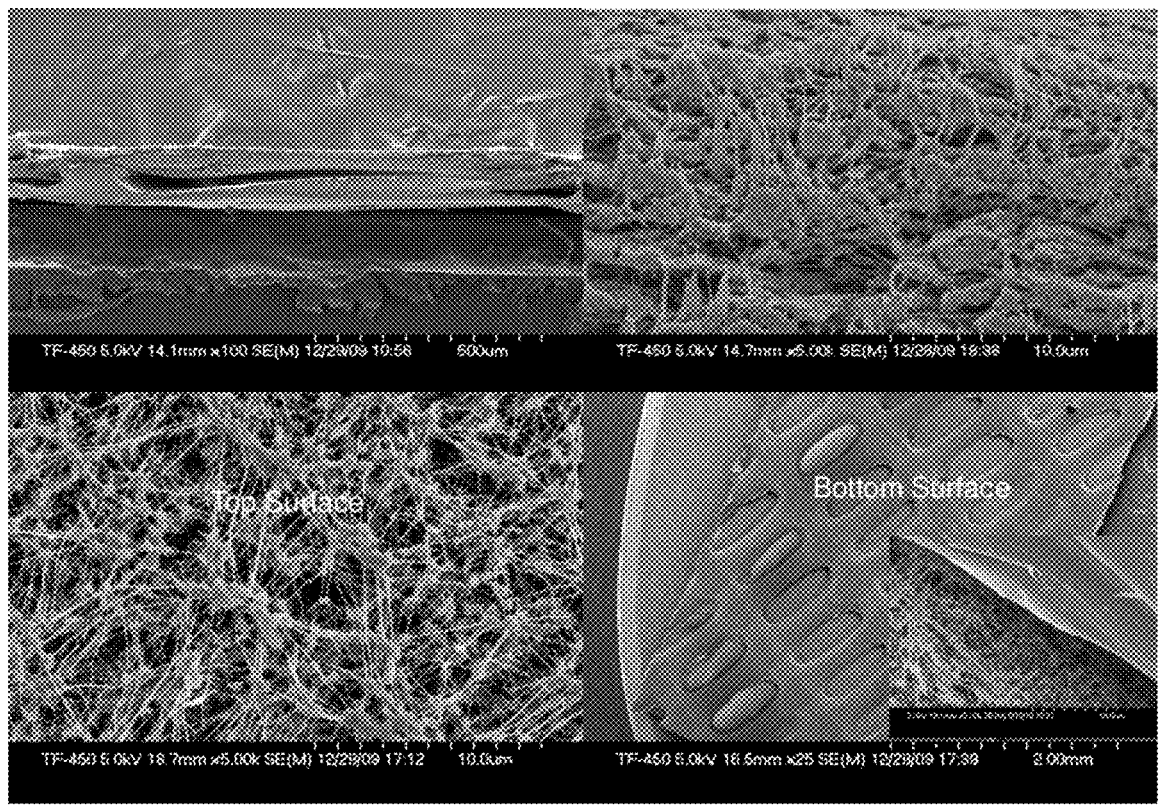
FIG. 8—is a display of 4 scanning electron micrographs (SEMs) of a large pore size TF 450 microfiltration membrane showing its composite nature and high pore size. Top left is a cross-section at 500 microns scale of the entire membrane thickness showing at the top the large pore size filtration layer and below a perforated underlayer; top right is a cross-section showing a magnified view at the 10 microns scale of the upper surface; bottom left is a view of the surface at high magnification (10 micron scale) showing the large pore size and high porosity of the surface; bottom right is a low magnification (2 mm scale) of the bottom surface showing the perforated underlayer (inset is a 10 micron-scale view through a perforation in the bottom surface showing the homogeneous porosity of the filtration layer).
Figure 9:
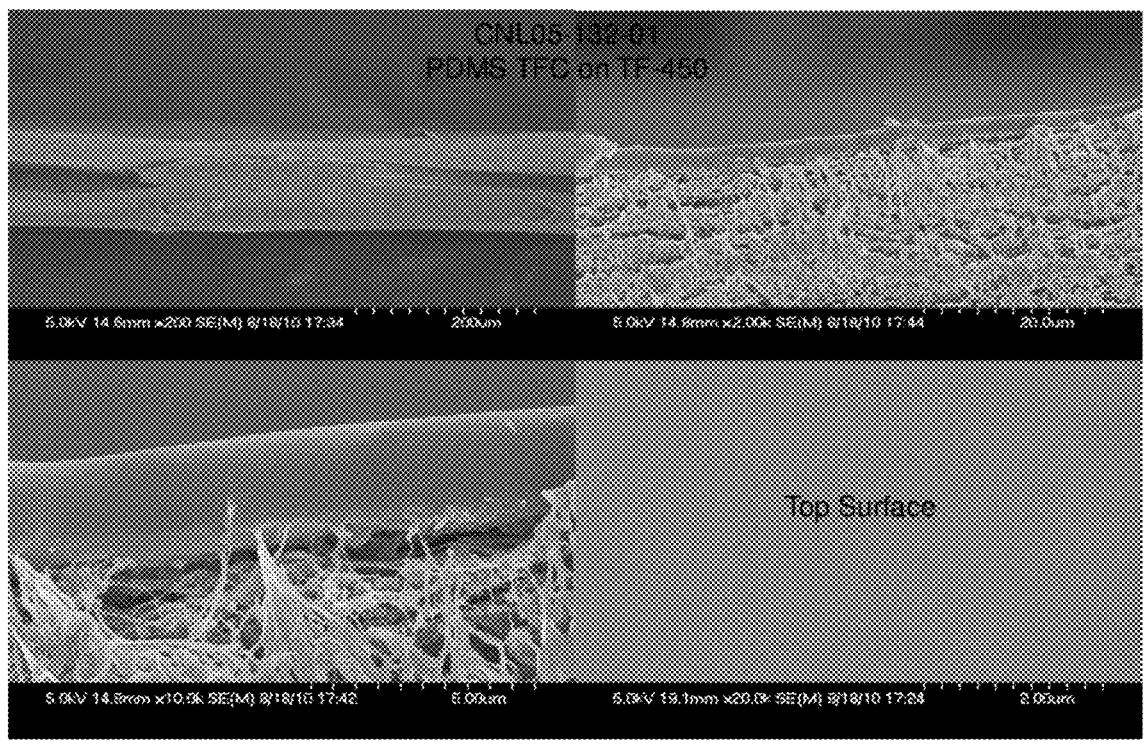
FIG. 9—is a display of 4 scanning electron micrographs (SEMs) of a PDMS thin-film composite prepared in our lab using a large pore size TF 450 membrane as the support layer. Top left is a cross-section at 200 microns scale of the entire membrane thickness showing at the top the large pore size filtration layer and below the perforated underlayer of the TF 450 membrane (the PDMS top layer is too thin to be visible at this scale); top right is a cross-section showing a magnified view at the 20 microns scale of the 2.5 micron PDMS layer and the TF 450 upper surface; bottom left is the same view at higher magnification (5 micron scale); bottom right is a high magnification (2 micron scale) of the PDMS top surface showing its homogeneous, nonporous, defect-free nature.

The structure of two support membranes and a PDMS TFC fabricated by our process are displayed in FIGS. 7, 8, and 9. These are scanning electron micrographs (SEMs). FIG. 7 shows the structure of the PES20 small pore support. FIG. 8 shows the structure of the high porosity TF-450 support. FIG. 9 shows the structure of one of our PDMS TFCs using the TF-450 support. Comparing the PES20 and TF-450 supports, it is clear that the TF-450 has much larger pores and higher porosity. In FIG. 9, the PDMS active layer can seen to be uniformly 2.5 microns in thickness, nonporous and smooth.

The separation processes employing thin-film composite membranes with a nonporous active layer include pervaporation (liquid feed/vapor permeate), vapor permeation (vapor feed/vapor permeate), gas separation (gas feed/gas permeate), and reverse and forward osmosis (liquid feed/liquid permeate, rejection of salts and other dissolved materials). These processes are described by R. W. Baker, Membrane Technology and Applications, 2nd ed., John Wiley & Sons, 2004.

The active layer composition is chosen based on the desired application. One application is the removal of dilute organic compounds from water. These compounds may be, for instance, alcohols such as methanol, ethanol, butanol, carboxylic acids such as acetic acid, and/or other compounds from fermentation broths, or volatile organic compounds (VOCs) from waste or processing waters. For removal of dilute organics from water, a hydrophobic active layer is desired. Suitable active layer polymers are described in U.S. Pat. Nos. 4,925,562, and 5,030,356, the contents of which are incorporated by reference. Additionally, other suitable materials include newer materials such as the high fractional free volume polyacetylenes and polybenzodioxanes Mixed matrix active layers for these applications incorporate hydrophobic zeolite particles into the polymer to enhance the selectivity and flux. Suitable zeolites are also described in U.S. Pat. No. 4,925,562, the contents of which are incorporated by reference. Other materials that may be incorporated into a polymer to form a mixed matrix membrane are carbon molecular sieves, activated carbon, and metal-organic framework materials.

Another application is removal of water from miscible organic solutions with water concentrations below about 50%, and preferably below 20%, such as mixtures near the azeotrope. Here, hydrophilic polymers are used for the active layer, such as poly(vinyl alcohol)[PVA], cellulose acetates, polysulfones, polyimides and others. Mixed matrix active layers for these applications incorporate hydrophilic zeolites, carbon molecular sieves, fumed silica or other particles into the polymer to enhance the selectivity and flux.

A third type of application is separation of mixtures of organic compounds such as benzene/cyclohexane, methanol/carboxylate esters, and methanol/dimethyl carbonate using either organophilic (benzene selective) or hydrophilic (methanol selective) active layers.

Figure 3:
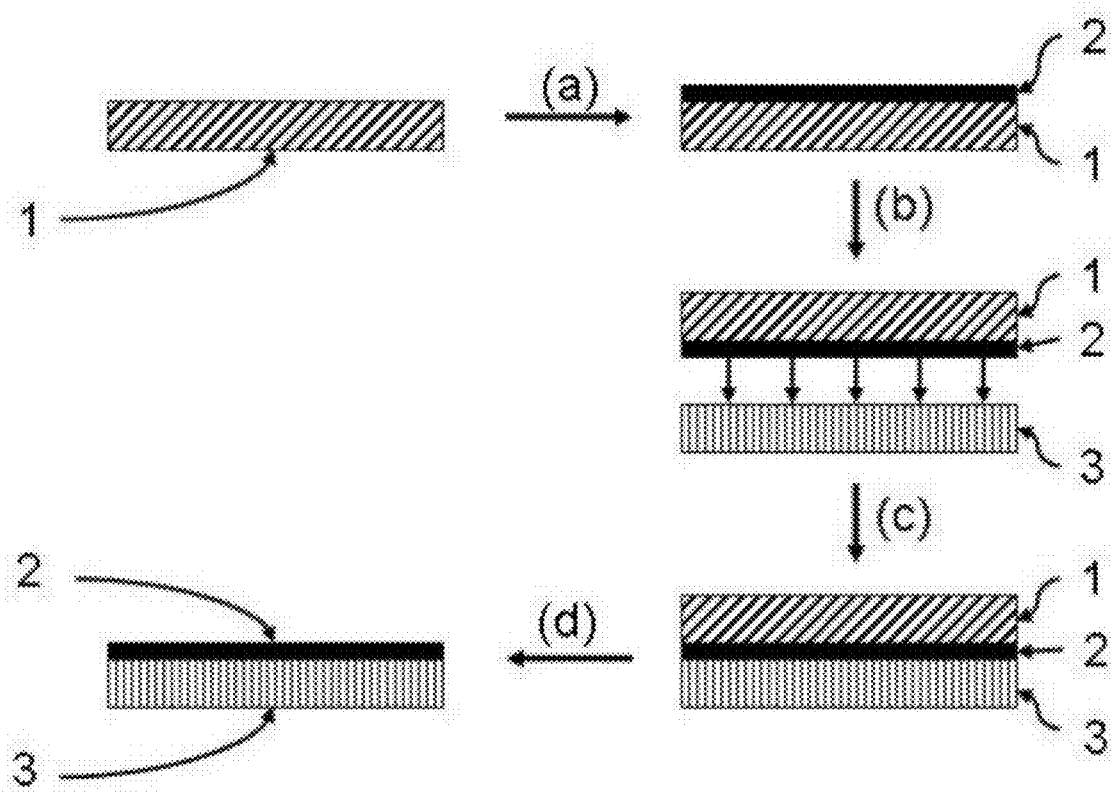
FIG. 3—is a drawing of the formation method. In step (a) the active layer (2) is formed on the transfer film (1). In step (b), the formed active layer (2) is positioned over the support layer (3). In step (c) the active layer (2) is placed against the support layer (3). In step (d) the transfer layer (1) is removed, resulting in the desired composite membrane composition.

The fabrication method involves initially forming the active layer on a transfer film, placing the active layer so formed against a porous support layer, and removing the transfer film. See FIG. 3.

The transfer film may vary in composition depending on the active layer composition, the solvent(s) used to form the active layer and the method of removal of the transfer film. The transfer film must not be dissolved by the solvent(s) in which the active layer monomers or prepolymers are dissolved. For example, if a hydrophobic alkane solvent were used to solubilize the active layer prepolymers in order to cast them in a film, a suitable transfer film could be a hydrophilic polymer that was not dissolved or significantly swelled by the hydrophobic solvent. Commercial films may be suitable for use as the transfer film.

A preferred embodiment is the use of water soluble transfer films, such as PVA, wherein plasticisers may be incorporated. Plasticisers for PVA include glycerol, sorbitol, and polyethylene glycol (PEG).

The porosity of the support layer may be homogeneous or asymmetric.

The support layer may be an ultrafiltration or microfiltration membrane, which are often asymmetric in porosity. They generally have a layered structure comprising a nonwoven fiber mat layer, overlaid with a macroporous layer combined with a thin microporous skin layer. Alternatively, the support layer may be homogeneously micro- or macro-porous, as long as the porosity of the surface adjacent to the active layer is of a smaller dimension than the thickness of the active layer.

The transfer film may be formed by solution casting, melt extrusion, press molding, blow molding, dip coating, or other fabrication methods, or obtained from suitable commercial films. The deposition of the active layer on the transfer film may be accomplished through solution casting, dip coating, spin coating, or vapor deposition. Solvent (if used) is removed and the active layer is cured.

The method of interfacing the transfer film with the support layer is accomplished with or without a discrete attachment step. An attachment may be through (a) heat or radiation such as spot tacking, (b) covalent chemical or ionic bonding wherein reactive groups on the support layer or pretreated surface of the support layer, and reactive groups on the active layer after formation on the transfer film are reacted when placed together (for example, by formation of a covalent carbon-carbon or a carbon-silicon bond, or an ester, ether, amide, disulfide, peptide or other such chemical unit linking the active layer polymer to the support layer polymer), (c) hydrogen bonding, (d) Van der Waals forces, (e) use of a sparse interface layer such as thin mesh melded to the support layer without harmful occlusion of either support porosity or the area of the active layer. An interaction which does not involve discrete attachment to the support layer is the use of a feed spacer in the membrane module to hold the active layer in place against the support layer.

Removal of the transfer film is accomplished via peeling, dissolving using aqueous or organic solvents, or vaporization. In an alternative embodiment, the transfer film may be left on if there is no harmful reduction in flux or performance of the membrane.

A key embodiment of the invention is the use of in-module dissolution wherein after production of the membrane assembly into the spiral-wound or the plate-and-frame module design containing the composite that has intact removable film, the film is dissolved away after assembly of the module. Dissolution of the film after membrane assembly prevents damage that may occur to the fragile active layer through handling during composite fabrication, module assembly, shipment, or installation at the use site.

The thin membrane composition finds utility in a variety of processes including but not limited to pervaporation; vapor permeation; gas separation; perstraction; reverse or forward osmosis; dialysis. Applications include but are not limited to (a) selective removal of dilute organics from aqueous solutions, such as ethanol (for fuel, or to reduce the alcohol content in wines and beers), butanol, other alcohols, carboxylic acids, esters (such as ethyl acetate), ketones, aroma/flavor compounds; (b) selective removal of low concentrations of water from organics, especially near azeotropes, such as dehydration of ethanol, water removal from esterification reactions and polymerizations; (c) separating organic mixtures or isomers such as alkanes from alkenes, aromatics from parafins; (d) separating gas mixtures, such as carbon dioxide/methane (natural gas or biogas upgrading), carbon dioxide/hydrogen (syngas upgrading), ethane/ethylene, oxygen/nitrogen. The composition may also find utility in packaging applications requiring multilayer laminates, and especially those requiring selective gas permeation for control of oxygen, carbon dioxide, water vapor, and/or ethylene in food packaging. Another use is controlled release of drugs, pesticides, flavors and fragrances. A drug may be released in a controlled manner from a skin patch or other reservoir, with the rate of release governed by the permeation characteristics of the active layer. Similarly, a pesticide, pheromone, or other substance that has activity against an insect, fungus, weed species, or which serves as a plant growth regulator may be released in a controlled manner from a reservoir through the composite membrane. Again, scents may be released from reservoir strips in a controlled manner by application of the active permeation-controlling layer.

EXAMPLES

Example 1

20.5 Micron Poly(Dimethylsiloxane) Membrane Using a Poly(Vinylalcohol) Transfer Film, and a PES-20 Support Layer Prepare Poly(Vinylalcohol) (PVA) Transfer Film:
Combine 80% hydrolyzed poly(vinyl alcohol) (Aldrich) with water to make a 4% solution by weight. Mix until are solids are dissolved. Cast 12.43 g of this solution into a 3.75" diameter casting dish to make a 55 micron film after evaporating the water.

Prepare Poly(Dimethylsiloxane) (PDMS) Solution:

Combine 0.1367 g RTV615A (Momentive Performance Materials) and 4.1146 g isooctane in a vial. Add 0.0164 g RTV615B (cross-linker). Shake vial to mix. This amount of solution will make a 20.5 micron PDMS membrane in the casting dish.

Cast PDMS Solution on PVA Film:

In a vacuum oven, cast all the PDMS solution so as to wet the entire surface of the PVA film. Slowly pull vacuum on the oven to evaporate the isooctane over about one hour at room temperature, but not so rapidly as to boil the solvent. After all the solvent has evaporated, heat the oven to 70° C. for 5 hours to cure the PDMS. Carefully remove the cured composite membrane from the dish Add the support layer and dissolve away the PVA transfer film: Place an 83×45 mm piece of PES-20 polyethersulfone ultrafiltration sheet membrane (Sepro) on top of the PDMS/PVA membrane (skin-side of PES20 facing PDMS). Cut the membrane assembly to the 83×45 mm size required for the test cell. Place the membrane assembly in the test cell (PVA facing feed) and close the cell to seal the membrane. Run water through the test cell for one hour to completely dissolve the PVA. In a pervaporation test with a 5% ethanol feed at 50° C. and less than 2 torr permeate pressure, the resulting TFC membrane gave a separation factor (ethanol/water) of 8.17 and a flux of 493 g/m$^2$ hr.

Example 2

5.0 Micron PDMS Membrane Using a PVA Transfer Film with Glycerol Plasticizer, and a TF-450 Support Layer Prepare Poly(Vinylalcohol) (PVA) Transfer Film with Glycerol Plasticizer:

Combine 80% hydrolyzed poly(vinyl alcohol) (Aldrich) with water to make a 4% solution by weight. Mix until are solids are dissolved. Combine glycerol and water to make a 10% solution. Mix 20.19 g 4% PVA solution and 0.85 g 10% glycerol solution. Cast 20.90 g of this mixture into a 11.4 mm×9.5 mm casting dish to make a 65 micron film after evaporating the water.

The remaining steps are the similar to those in example 1, except that a TF-450 (PTFE on polypropylene) microfiltration sheet membrane (Pall) is used for the support layer.

In a pervaporation test with a 5% ethanol feed at 50° C. and less than 2 torr permeate pressure, the resulting TFC membrane gave a separation factor of 8.55 and a flux of 2014 g/m$^2$ hr.

Example 3

5.0 Micron PDMS Membrane Using a PVA Transfer Film with PEG400 Plasticizer, and a PES-20 Support Layer Prepare Poly(Vinylalcohol) (PVA) Transfer Film with Polyethylene Glycol 400 (PEG400, Fluka) Plasticizer:

Combine 80% hydrolyzed poly(vinyl alcohol) (Aldrich) with water to make a 4% solution by weight. Mix until are solids are dissolved. Combine PEG400 and water to make a 10% solution. Mix 13.70 g 4% PVA solution and 0.55 g 10% PEG400 solution. Cast 14.09 g of this mixture into a 3.75" diameter casting dish to make a 66 micron film after evaporating the water.

The remaining steps are similar to those in example 1, using a PES-20 support layer. In a pervaporation test with a 5% ethanol feed at 50° C. and less than 2 torr permeate pressure, the resulting TFC membrane gave a separation factor of 6.12 and a flux of 1592 g/m$^2$ hr. Comparison with example 2 shows that the more porous support layer, TF-450, gives higher separation factor and higher fluxes than the less porous support layer, PES-20.

Example 4

44 Micron PDMS Membrane Using a Carboxymethylcellulose Transfer Film, and a PES-20 Support Layer Prepare Carboxymethylcellulose (CMC) Transfer Film:

Slowly add sodium salt of carboxymethylcellulose (Aldrich) to water with mixing to make a 2% solution by weight. Cast 52.5 g of this solution into a 5.5" diameter polystyrene Petri dish bottom to make a 43 micron film after evaporating the water.

The remaining steps are similar to those in example 1 except that the CMC film is substituted for the PVA film. A PES-20 support layer is used. In a pervaporation test with a 5% ethanol feed at 50° C. and less than 2 torr permeate pressure in a pervaporation run, the resulting TFC membrane gave a separation factor of 6.83 and a flux of 272 g/m2 hr.

Example 5

9.9 Micron Mixed Matrix Membrane (MMM, 60.5% ZSM-5 Zeolite in PDMS) Active Layer Using a PVA Transfer Film with Glycerol Plasticizer, and a PES-20 Support Layer Prepare Glycerol Plasticized PVA Film as in Example 2.
Prepare MMM Casting Mixture:

Combine 0.0942 g ZSM-5 zeolite (CBV 28014, Zeolyst International), 0.04608 g RTV615A (Momentive Performance Materials) and 5.0825 g isooctane in a vial. Sonicate the mixture for 10 minutes to disperse solids. Add 0.01543 g RTV615B (cross-linker). Shake vial to mix well. This mixture makes a 9.9 micron MMM active layer in the casting dish.

The rest of this example follows the procedure of example 2, except that a PES-20 support is used. With a 5% ethanol feed at 50° C. and less than 2 torr permeate pressure in a pervaporation run, the TFC membrane gave a separation factor of 13.85 and a flux of 882 g/m2 hr.

Example 6

9.9 Micron Mixed Matrix Membrane (MMM, 61.0% ZSM-5 Zeolite in PDMS) Active Layer Using a PVA Transfer Film with Glycerol Plasticizer, and a Supor-800 Support Layer Prepare Glycerol Plasticized PVA Film as in Example 2.
Prepare MMM Casting Mixture:

Combine 0.10291 g ZSM-5 zeolite (Zeolyst), 0.04941 g RTV615A (Momentive Performance Materials) and 5.4295 g isooctane in a vial. Sonicate the mixture for 10 minutes to disperse solids. Add 0.01647 g RTV615B (cross-linker).

Shake vial to mix well. This mixture makes a 9.9 micron MMM active layer in the casting dish.

The rest of this example follows the procedure of example 2, except that a Supor-800 support (polyethersulfone microfiltration support, Pall) is used. With a 5% ethanol feed at 50° C. and less than 2 torr permeate pressure in a pervaporation run, the TFC membrane gave a separation factor of 22.75 and a flux of 1474 g/m² hr. Comparison with example 5 shows that the more porous support in this example, Supor-800, gave a higher separation factor and a higher flux than the less porous support, PES-20, in example 5.

REFERENCES

Aroujalian, A., K. Belkacemi, S. J. Davids, G. Turcotte, and Y. Pouliot, Effect of Protein on Flux and Selectivity in Pervaporation of Ethanol from a Dilute Solution, Sep. Sci. Technol. 38: 3239-3247 (2003).

Baker, R. W. 2004. Membrane Technology and Applications. John Wiley & Sons Ltd, Chichester, England.

Blume, I., J. G. Wijmans, and R. W. Baker, The Separation of Dissolved Organics from Water by Pervaporation, J. Membrane Sci. 49: 253-286 (1990).

Cen, Y. and R. N. Lichtenthaler, Pervaporation Characteristics of Zeolite-Filled PDMS Composite Membranes, Bakish, R. L., Proceedings of Sixth International Conference on Pervaporation Processes in the Chemical Industry, 90-99. Edgewood, N.J., Bakish Materials Corp. (1992).

Dobrak, A., A. Figoli, S. Chovau, F. Galiano, S. Simone, I. F. J. Vankelecom, E. Drioli, and B. Van der Bruggen, Performance of PDMS membranes in pervaporation: Effect of silicalite fillers and comparison with SBS membranes, J. Colloid Interf. Sci. 346: 254-264 (2010).

Gudernatsch, W., Th. Menzel, and H. Strathmann, Influence of composite membrane structure on pervaporation, J. Membrane Sci. 61: 19-30 (1991).

Jia, M.-D., K.-V. Peinemann, and R.-D. Behling, Preparation and characterization of thin-film zeolite-PDMS composite membranes, J. Membrane Sci. 73: 119-128 (1992).

Kaschemekat, J., J. G. Wijmans, R. W. Baker, and I. Blume, Separation of Organics from Water using Pervaporation, Bakish, R. L., Proceedings of the Third International Conference on Pervaporation Processes in the Chemical Industry, 405-412. Edgewood, N.J., Bakish Materials Corp. (1988).

Li, L., S. Tan, D. Jiang, F. Wu, Z. Xu, and Z. Zhang, Influence of support layer of composite PDMS membranes on performance of hydrophobic pervaporation, J. Chem. Indust. Eng. (China) 57: 61-65 (2006).

Liang, L. and E. Ruckenstein, Pervaporation of ethanol-water mixtures through polydimethylsiloxane-polystyrene interpenetrating polymer network supported membranes, J. Membrane Sci. 114: 227-234 (1996).

Mulder, M. H. V. 1996. Basic Principles of Membrane Technology, 2nd ed. Kluwer Academic Publishers, Dordrecht, The Netherlands.

O'Brien, D. J. and J. C. Craig, Ethanol production in a continuous fermentation/membrane pervaporation system, Appl. Microbiol. Biotechnol. 44: 699-704 (1996).

Shabtai, Y., S. Chaimovitz, A. Freeman, and E. Katchalski-Katzir, Continuous Ethanol Production by Immobilized Yeast Reactor Coupled with Membrane Pervaporation Unit, Biotechnol. Bioeng. 38: 869-876 (1991).

Vankelecom, I. F. J., B. Moermans, G. Verschueren, P. A. Jacobs, Intrusion of PDMS top layers in porous supports, J. Membrane Sci. 158: 289-297 (1999).

Wei, Z., Y. Xingju, and Y. Quan, Ethanol Fermentation Coupled with Complete Cell Recycle Pervaporation System: Dependence of Glucose Concentration, Biotechnol. Tech. 9: 299-304 (1995).

Zhu, C., M. Liu, and W. Xu, Separation of Ethanol-Water Mixtures by Pervaporation-Membrane Separation Process, Desalination 62: 299-313 (1987).

What is claimed is:

1. A method of fabricating a thin perm-selective layer on a support layer using a transfer film to form a membrane, the method comprising:
   (a) applying a solution of a cross-linkable polymer or prepolymer in a first solvent onto the transfer film; the transfer film being soluble in a second solvent and insoluble in the first solvent;
   (b) evaporating the first solvent and curing to cross-link the polymer or prepolymer to form the thin perm-selective layer on the transfer film;
   (c) placing the support layer against the thin perm-selective layer;
   (d) dissolving the transfer film in the second solvent and removing the transfer film solution, thus leaving the thin perm-selective layer on the support layer.

2. The method of claim 1, wherein the method for applying the solution to the transfer film is selected from the group consisting of casting, spraying, dip coating, painting, spreading, or rolling.

3. The method of claim 1, wherein the second solvent to dissolve the transfer film is water.

4. The method of claim 3, wherein the water soluble transfer film is selected from the group consisting of polyvinyl alcohol, carboxymethylcellulose, and methyl cellulose.

5. The method of claim 4, wherein the water soluble film is partially hydrolyzed cold water-soluble polyvinyl alcohol.

6. The method of claim 3, wherein the water soluble film is either cast from an aqueous solution or is a commercial preformed soluble film.

7. The method of claim 3, wherein a plasticizer is included in the water soluble film.

8. The method of claim 7, wherein the plasticizer is selected from the group consisting of glycerol, polyethylene glycol of various molecular weights, sugar alcohols such as sorbitol, and alkyl glycols such as propylene glycol and ethylene glycol.

9. The method of claim 7, wherein the concentration of the plasticizer in the water soluble film is in the range of about 1% to about 25% by weight.

10. The method of claim 1, wherein the transfer film solvent is selected from the group consisting of water, alcohols, ketones, carboxylic acids, ethers and esters.

11. The method of claim 1, wherein the permanent mechanical support is a porous ultrafiltration or microfiltration membrane.

12. The method of claim 11, wherein the support has an average pore size greater than about 0.2 microns.

13. The method of claim 1, wherein the polymer solvent is a hydrocarbon such as isooctane, hexane, toluene, or xylene.

14. The method of claim 1, wherein the polymer is a hydrophobic, silicone-containing polymer such as polydimethylsiloxane (PDMS), polyoctylmethylsiloxane (POMS), poly(1-ethyldimethylsilyl-1-propyne) (PEDMSP), poly(1-trimethylsilyl-1-propyne) (PTMSP)), or a hydrophobic block copolymer such as polyether-block-amide (PEBA).

15. The method of claim 14, wherein the polymer is a room temperature vulcanizing polydimethylsiloxane.

16. The method of claim 1, wherein the permselective membrane has a thickness in the range of about 0.2 micron to 80 microns, preferably less than 25 microns, more preferably 10 microns or less.

17. The method of claim 1, wherein the polymer solution is in a concentration range between 0.1% and 50% by weight of polymer.

18. The method of claim 1, wherein one or more additives are included in the polymer solution to improve membrane performance.

19. The method of claim 18, wherein an additive is an adsorption-selective material.

20. The method of claim 19, wherein an additive is a hydrophobic zeolite such as Silicalite-1 or ZSM-5.

21. The method of claim 19, wherein the adsorption-selective material is included in a concentration range between about 5% and 80% by weight of the cured permselective membrane layer.

22. The method of claim 18, wherein an additive is a filler.

23. The method of claim 18, wherein an additive is a dispersant.

24. The method of claim 18, wherein an additive compatibilizes the permselective membrane and the soluble transfer film.

25. The method of claim 18, wherein an additive promotes adherence of the polymer permselective layer to the support layer.

* * * * *